United States Patent [19]

Lever

[11] 4,216,255
[45] Aug. 5, 1980

[54] STRUCTURAL ELEMENT FOR THREE-DIMENSIONAL OBJECTS, E.G. FURNITURE

[76] Inventor: Robert J. A. B. Lever, Veerstraat 2, Schoonhoven, Netherlands

[21] Appl. No.: 911,154

[22] Filed: May 31, 1978

[30] Foreign Application Priority Data

Jun. 16, 1977 [NL] Netherlands ..................... 7706669

[51] Int. Cl.² ............................................ F16B 12/44
[52] U.S. Cl. ..................................... 428/57; 52/280; 217/65; 403/231; 403/402
[58] Field of Search ................... 52/280, 656, 475; 403/231, 401, 402; 428/57–61; 217/65

[56] References Cited

U.S. PATENT DOCUMENTS

| 378,601 | 2/1888 | Linderman | 217/65 |
| 915,113 | 3/1909 | Riddle | 217/65 |
| 1,847,925 | 3/1932 | Carter | 403/401 X |

FOREIGN PATENT DOCUMENTS

| 816971 | 7/1969 | Canada | 403/402 |
| 1917612 | 11/1970 | Fed. Rep. of Germany | 403/402 |
| 642760 | 7/1962 | Italy | 403/402 |
| 170517 | 7/1934 | Switzerland | 403/401 |

OTHER PUBLICATIONS

*Science Illustrated,* Dec. 1948, "How to Join Wood" pp. 84 and 85.

*Primary Examiner*—Marion McCamish
*Assistant Examiner*—Alexander S. Thomas

[57] ABSTRACT

This invention relates to a structural element for three-dimensional objects, e.g. furniture, said element having the shape of a longitudinal section, such that standard sections, mutually only differing in length, may be used for assembling the object. The section thereto comprises at least two longitudinal legs which include an angle, of which each leg is chamfered at its joining end with another of said elements at a predetermined angle with the longitudinal axis of the leg, perpendicular to the plane of that leg, such that the chamfering angles with the longitudinal axis of two legs of two sections to be joined to each other, which legs are in the same plane after the connection of the sections, are mutually equal, in which each leg of a section has at least one tenon projection and the element to be joined thereto having at least one corresponding mortise for receiving said tenon projection.

The construction achieved by said sections is rigid without the use of additional fastening means.

10 Claims, 5 Drawing Figures

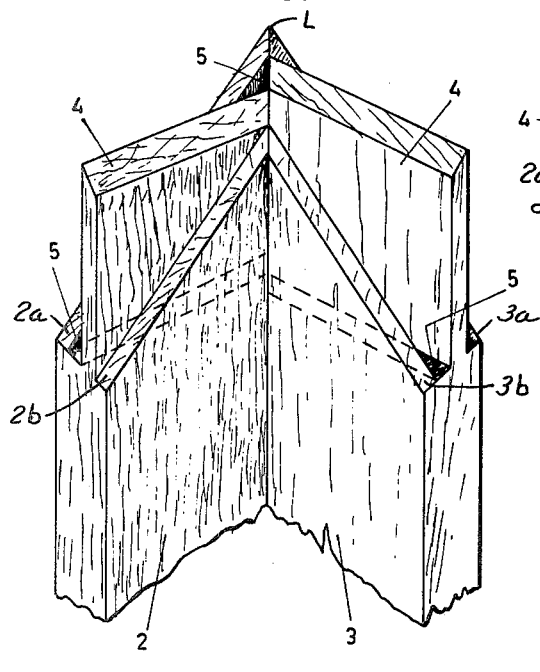
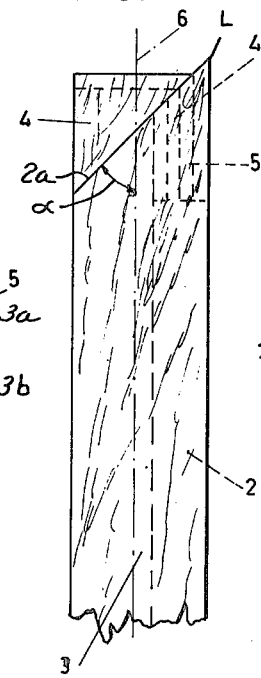
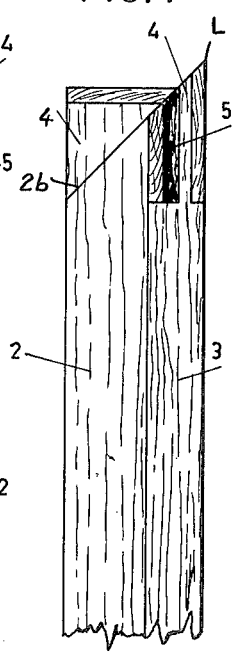
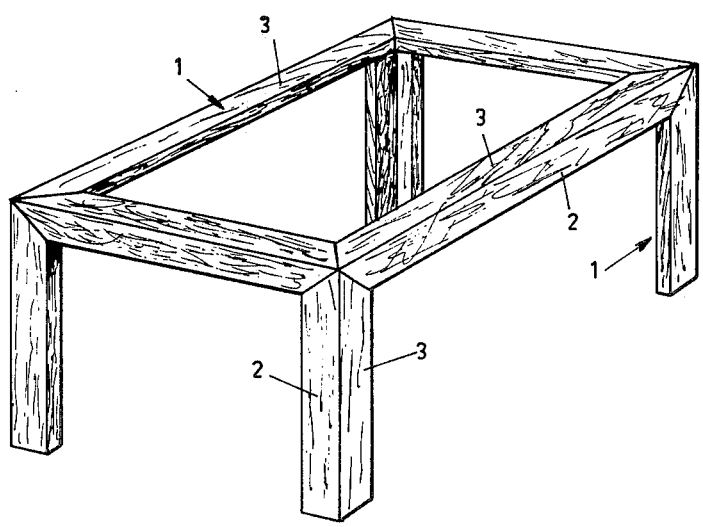

STRUCTURAL ELEMENT FOR THREE-DIMENSIONAL OBJECTS, E.G. FURNITURE

The invention relates to a structural element for three-dimensional objects, e.g. furniture, said element having the shape of a longitudinal section.

Three-dimensional objects such as cases, cabinets, tables, chairs and so on, comprising shaped uprights and horizontal members are known but usually for a particular object different types of sections are used. The cross-sectional shape of the section as well as the thicknesses of its parts may differ. If for the connection of the sections, tenon and mortise joints are used, also the tenons and the mortises may have different shapes and dimensions.

The invention aims at offering a simplification in this respect by proposing such construction of the used elements that for all uprights and horizontal members the same type of longitudinal section may be used. Said elements may be made available to the market in a series of standard lengths, e.g. with mutual differences in length of 5 centimeters.

This is obtained according to the invention in that the section comprises at least two longitudinal legs which include an angle, of which each leg is chamfered at its joining end with another of said elements under a predetermined angle with the longitudinal axis of the leg, perpendicular to the plane of that leg, such that the chamfering angles with the longitudinal axis of two legs of two sections to be joined to each other, which legs are in the same plane after the connection of the sections, are mutually equal, in which each leg of a section has at least one tenon projection and the leg to be joined thereto having at least one corresponding mortise for receiving said tenon projection.

By using a section having legs in different planes not only a rigid construction is achieved but simultaneously it is possible to obtain corner joints in three dimensions without using additional fastening means.

Particularly hobbyists are enabled by said elements to easily assemble all kinds of furniture according to their own design. With three elements one may repeatedly assemble a three-dimensional corner joint, simply by sliding three elements of suitable standard length, or sawed to the desired length, into mutual engagement with their tenon and mortise end respectively. By the application of a suitable adhesive to the tenons or in the mortises a permanent connection may be obtained.

The sectional shape of the element may be a corner section, a T-section or a cross-shaped section, with two, three or four legs respectively, or having an arbitrarily different section, e.g. with still mort legs. The angles between the legs may also be arbitrary. Usually, however, said angles will be 90°. The thickness of the legs depends on the purpose in view, the expected loading of the object and the selected material which may be wood, synthetic material or metal. It is to be noted that the cross-section of the sections is not necessarily isosceles.

The chamfering angles of the sections may be arbitrary. If one desires that the support be formed of upright and horizontal members which are mutually perpendicular then the chamfering angle must be 45°. Thereby one achieves objects shaped as a rectangular block or parallelopiped, with as a special shape cubes if all elements have equal length. However, arbitrarily shaped blocks with parallelogram sides are also possible, namely with chamfering angles different from 45°.

Dependent on the proposed loading of the objects the connecting ends of the legs of the elements may have one tenon projection and one mortise or more assemblies of tenon and mortise. It is also possible to provide only a tenon or only a mortise per leg end. If for example a section is then assembled from a leg with a tenon at the end and a leg with a mortise at the end, the sections are mutually interchangeable everywhere in the object, which is in any case obtained if each leg end is provided with at least one tenon and at the same time with at least one mortise. Said interchangeability is easy for the assembly of furniture but also comprises an important manufacturing advantage in that then all used elements are identical. Only the length may differ or may be made different respectively. The legs of a section may be manufactured each separately and therein the tenons and mortises may be provided at the same time (synthetic material) or later on, whereafter a number of legs may be mutually joined to the desired section, e.g. by applying adhesive. It is also possible to manufacture the section as an integral unit and thereafter provide it with tenons and mortises. This may be done by operations like sawing, cutting or milling.

In order to keep the thickness dimensions of the section legs small it may be desirable to provide the tenons and the mortises, if each leg has at least one tenon projection and one mortise, such that a side wall of a tenon projection lies in the same plane with a side wall of a mortise.

The invention will be further illustrated hereunder with reference to the drawing in which an embodiment of the structural element according to the invention is shown.

FIG. 2 shows an end view in perspective on the joining end of a single element, on an enlarged scale.

FIG. 3 is a side view of the end to be joined of an element as seen on the outer surface of one of the legs.

FIG. 4 is a side view of the same element as seen on the free end of a leg.

FIG. 5 shows an exemplified application of the elements as fromed into the basic frame of a table.

Figure 1:
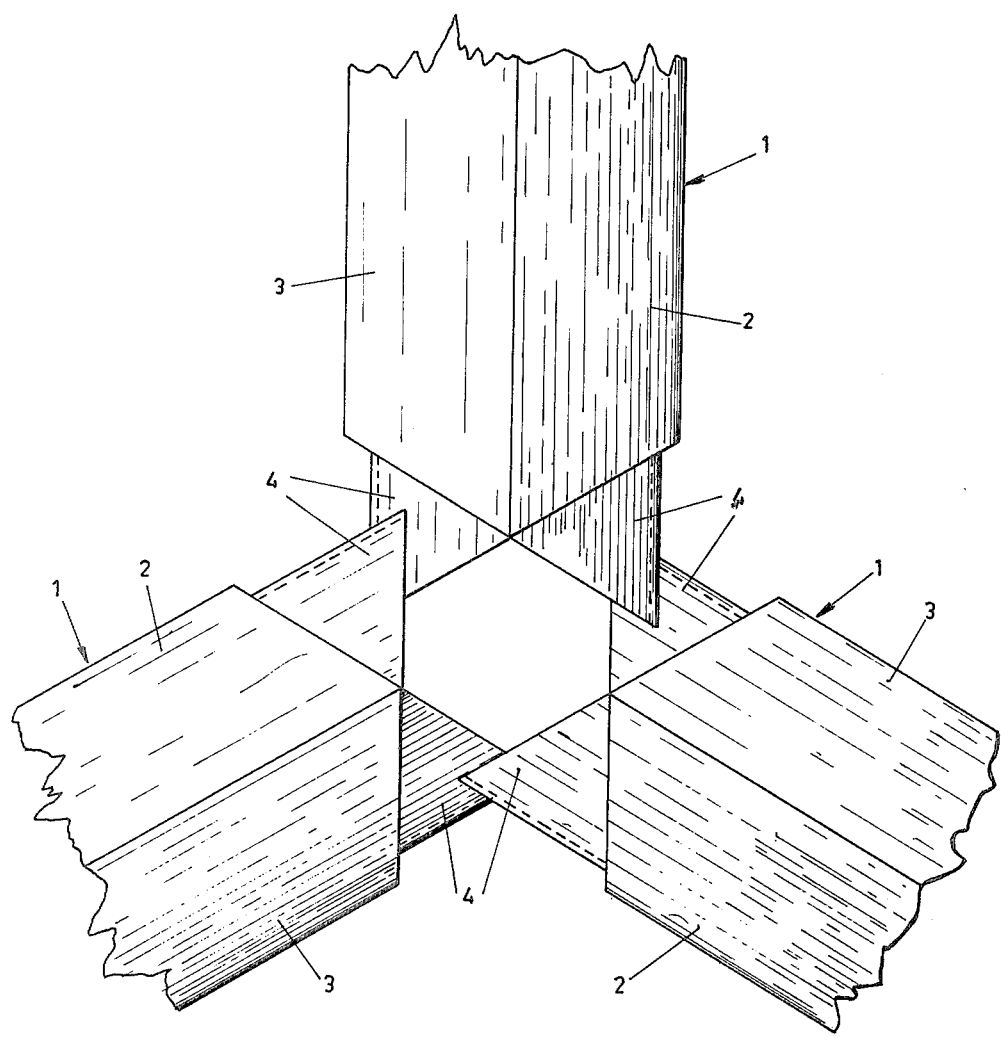
FIG. 1 shows in perspective the ends to be joined of three elements in the position in which they may be mutually engaged by sliding.

As an example the drawing shows elements which are corner sections of which the legs are mutually perpendicular. Further the elements have been chamfered at their joining ends under 45° with the longitudinal axis. The legs each have one tenon projection and one mortise. As said above other section shapes and other angles, as well as a different number of tenon projections and mortises are possible.

FIG. 1 shows three elements 1, each element comprising two generally planar legs 2, 3, in the position just prior to sliding said three elements mutually into engagement into a three-dimensional corner joint.

Each of the longitudinal legs 2, 3 is chamfered at its common end at a predetermined angle α (to the longitudinal axis 6) and inwardly from its inner and outer surfaces, perpendicular to its plane, to form end walls 2a, 2b, and 3a, 3b. Between these end walls, each leg 2, 3 is also formed with a tenon projection 4 and adjacent to it with a recess or mortise 5, visible in FIG. 2. The shape and dimensions of the mortise correspond with those of the tenon projection; the tenon and mortise of one leg being disposed oppositely with respect to those of the other leg so that a similar formed element may be made to fit one in the other as seen in FIG. 1. The end of the tenon 4 of each leg is itself chamfered at the predetermined angle $\alpha$ so that as seen in FIGS. 3 and 4 the chamfer of the tenon 4 of one leg lies in the plane of the end walls 2a, 2b, and 3a, 3b, respectively of the other leg.

The chamfering angle with the axis 6 of a leg (FIG. 3) has been indicated by $\alpha$ and is in the embodiment shown 45°, but, as said, may also have different values. As seen in FIGS. 2-4, the length of the tenons 4 has been kept somewhat shorter than the original length indicated by numeral L of the relative leg in order to obtain the coincidence of the vertex of the section angle of all three structural elements to form a corner joint in which the grain ends of the tenons will not be visible. Thereby selective corners are obtained as with the table as shown in FIG. 5. Therefore also the longitudinal ends of the tenons 4 have been chamfered according to the angle $\alpha$ so that they comprise an oblique surface, the tenon of one leg being itself shorter than the tenon of the other leg.

The tenon projection 4 and the mortise 5 of a single leg 2 or 3 of the elements 1 shown have been provided such that a side wall of the tenon projection 4 is in the same plane with a side wall of the mortise 5.

In the drawings, structural elements are shown having two legs set perpendicular to each other to define a right angle in cross-section. Sections of T-shape having three legs may be similarly formed as may cross-shaped sections having four legs. Similarly, each leg may have two or more correspondingly formed tenons and mortises.

The table base frame according to FIG. 5 relates to a rectangular table with four elements of equal length as the legs and with horizontal members of different length, however, the lengths thereof being equal in opposite pairs. The used elements are all identical, only the length may be different.

Variations and modifications of the present invention will be obvious to those skilled in the art and it is intended to cover in the appended claims all such modifications and equivalents as fall within the true spirit and scope of this inventions

I claim:

1. A structural element for erecting, with one or more similarly formed elements, three dimensional objects comprising an elongated member having at least two longitudinal planar legs, associated pairs of said legs being joined along one longitudinal edge angularly to each other to define inner and outer surfaces with respect to the angle so formed, each of the associated legs, at at least one common end, being formed with inner and outer end walls adjacent the inner and outer surfaces, respectively, said inner and outer end walls being chamfered from the joined longitudinal edge outwardly to the opposite longitudinal edge at a predetermined angle with the longitudinal axis and having a tenon projection and a corresponding mortise, the tenon and mortise of one leg of the associated pair being disposed oppositely to those of the other leg of the associated pair with respect to the inner and outer walls such that in one leg the mortise lies adjacent the outer end wall and the tenon lies adjacent the inner end wall and in the other leg the mortise lies adjacent the inner end wall and the tenon lies adjacent the outer end wall, the tenon of each one of the associated legs being chamfered respectively at said predetermined angle so as to lie in the plane of the end walls of the other of the associated legs whereby on joining at least two of said elements the tenons of one leg of one element fit within the mortise of one leg of the other element and the chamfered end walls abut each other.

2. The structural element according to claim 1, wherein said predetermined angle is equal to 45 degrees.

3. The structural element according to claim 1, wherein said tenon and mortise have a common side wall.

4. The structural element according to claim 1, wherein said legs are perpendicular to each other.

5. The structural element according to claim 4, wherein said legs form a corner section at right angles to each other.

6. The structural element according to claim 1, wherein said elongated member comprises legs formed T-shaped in cross-section.

7. The structural element according to claim 1 wherein said elongated member comprises four legs arranged in a cross-shaped section.

8. The structural element according to claim 1, wherein each leg is formed with two tenon projections and mortices, respectively.

9. The structural element according to claim 1, wherein the tenons terminate short of the longitudinal extent of the respective legs.

10. The structural element according to claim 9, wherein the tenon of one leg terminates shorter than the tenon of the other leg with respect to the longitudinal extent of the legs.

* * * * *